July 15, 1941.   P. KAPITZA   2,249,292

MEANS FOR STABILIZING HIGH SPEED ROTORS

Filed Nov. 3, 1938

P. Kapitza
Inventor

By: Glascock Downing & Seebold
Attys.

Patented July 15, 1941

2,249,292

UNITED STATES PATENT OFFICE 2,249,292

MEANS FOR STABILIZING HIGH SPEED ROTORS

Peter Kapitza, Moscow, Union of Soviet Socialist Republics

Application November 3, 1938, Serial No. 238,701 In the Union of Soviet Socialist Republics September 16, 1938

2 Claims. (Cl. 74—573)

The present invention relates to a coupling between a rotatable body and a shaft wherein the rotor may change its position with respect to the axis of the shaft when the latter vibrates.

In practice it is impossible to fix a fast rotating shaft to the rotors of turbines, turbocompressors and similar machines with high speed rotors with an exactness that would make the rotation free from the possibility of vibration.

According to the present invention the difficulty is overcome by fixing the rotor to its shaft in such a way that it is free enough to allow the main axis of the inertia to keep in line with the geometrical axis of rotation and friction is introduced so as to guard against accidental tensions and vibrations between the rotor and the shaft.

The various objects and features of the invention will be readily apparent to those skilled in the art upon a consideration of the accompanying drawing and the following description wherein several exemplary embodiments of the invention are disclosed.

Figure 1:
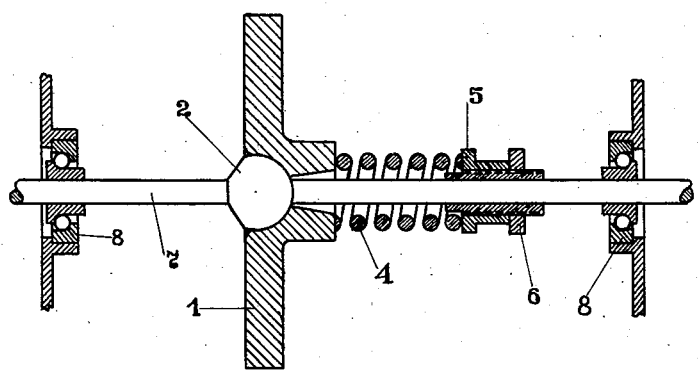
Fig. 1 is a sectional view of one form of the invention applied to a horizontal shaft.

Referring to the drawing and particularly to Fig. 1 there is represented at 1 a rotor having a hemispherical cavity which fits the convex part 2 of the shaft 7 protruding through the central opening of the rotor.

A suitably shaped nut 5 fixed to the shaft 7 is used as a support for a spring 4 pressing the concave surface of the cavity in the rotor onto the convex spherical surface 2 of shaft 7.

The spring 4 must be selected so that its application to the ring shaped nut 5 will provide enough pressure for a frictional coupling between the rotor 1 and the shaft 7.

At the same time the friction will not prevent the possibility of the rotor finding its required equilibrium.

Figure 2:
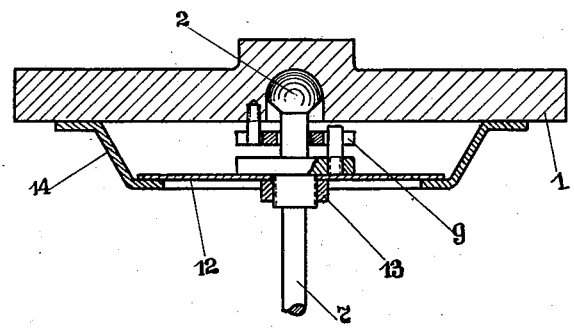
Fig. 2 is a sectional view of a modified arrangement.
Figure 3:
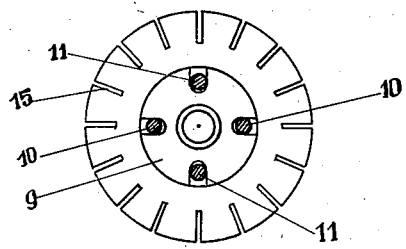
Fig. 3 is a plan view of the flexible diaphragm and the disc shown in Fig. 2.

A more perfect way of constructing the device is shown in Figs. 2 and 3 in which the shaft 7 has a ballshaped end fitting the cavity in the body of the rotor 1.

To a disc 13 of the shaft 7 is fixed an elastic diaphragm 12 which is constructed like a washer and provided with radial slits 15. The rim of the diaphragm is applied with friction to the inside surface of the ring 14 which is rigidly fixed to the rotor 1.

Between the rotor 1 and the disc 13 on the shaft 7 a washer 9 is freely arranged provided with a cross formation of four slots 10 and 11. In the two slots 10 pass two pins which are fixed to the rotor 1 and in the other two slots 11 pass two pins fixing it to the disc 13 of the shaft 7. In this way a universal joint is provided which allows the displacement of the rotor necessary for securing the possibility of the main axis of inertia of the rotor and the axis of rotation being in line and at the same time transmitting the required torque from the rotor 1 to the shaft 7.

I claim:

1. A device for rotors of high speed machine having a flexible shaft and a rotor turned by the shaft comprising, means for creating a frictional coupling between the rotor and the shaft permitting the principal axis of inertia of the rotor to coincide with the geometrical axis of rotation when the shaft is flexed, said frictional coupling consisting of spherical surfaces on the shaft and rotor, means for applying pressure between the spherical surfaces comprising an elastic washer attached to the shaft, a ring attached to the rotor having a wide central opening against the edge of which the elastic washer presses from the inside, and means for imparting torque from the shaft to the rotor consisting of two pins fixed with respect to the shaft and two pins on the rotor, freely fitted a disc having slots engaging all four pins.

2. A device for stabilizing rotors of high-speed machines having flexible shafts comprising in combination, means for transmitting torque between the shaft and rotor without slip, means for enabling the principal axis of inertia of the rotor to coincide with the geometric axis of rotation when the shaft is subjected to flexure oscillations, and the means for transmitting torque comprising a cardan coupling consisting of pins attached to the rotor, pins moved by the shaft, a washer arranged for free movement on the shaft, and said washer having slots for receiving said pins.

PETER KAPITZA.